United States Patent [19]

Pecha et al.

[11] Patent Number: 4,645,390

[45] Date of Patent: Feb. 24, 1987

[54] CUTTING TOOL FOR MAKING HOLES

[75] Inventors: Ernst Pecha, Nuertingen; Rudolf Trost, Dettingen/Erms; Rudi Gneiting, Frickenhausen-Linsenhofen; Karl-Eberhard Dieterich, Huelben, all of Fed. Rep. of Germany

[73] Assignee: bielomatik Leuze GmbH & Co., Fed. Rep. of Germany

[21] Appl. No.: 712,995

[22] Filed: Mar. 18, 1985

[30] Foreign Application Priority Data

Mar. 29, 1984 [DE] Fed. Rep. of Germany ....... 3411557

[51] Int. Cl.[4] ........................ B23B 51/05; B26B 9/02

[52] U.S. Cl. .................................... 408/233; 30/300; 30/310; 30/346; 30/357; 30/500; 144/24; 408/703

[58] Field of Search ................ 30/300, 310, 346, 353, 30/357, 500; 408/227, 228, 231–233, 703, 713; 144/21, 23, 24, 176, 231, 233–235

[56] References Cited

U.S. PATENT DOCUMENTS

D. 141,875 7/1945 Goldbert .......................... 30/346 X
2,134,069 10/1938 Zimmerman .................... 30/353 X
2,854,076 9/1958 Keim ................................ 30/310 X
3,257,871 6/1966 Goodyear ....................... 408/231 X

FOREIGN PATENT DOCUMENTS 1479850 7/1969 Fed. Rep. of Germany .
1959727 6/1971 Fed. Rep. of Germany ...... 408/227

*Primary Examiner*—Gil Weidenfeld
*Assistant Examiner*—Steven C. Bishop
*Attorney, Agent, or Firm*—Steele, Gould & Fried

[57] ABSTRACT

The rotary cutting tool is used for making holes in walls of thermoplastic materials, e.g. fuel tanks produced by the blowing process. Cutting blades pointing roughly in the axial direction are placed on the free end face of a circular, rotary tool member and said cutting blade score and displace, instead of cutting the material. The cutting blades are arranged at a drawing angle to the axial direction and slope to the inside or outside, depending on whether a burr is or is not required on the opening edge. A holding device in the form of a mandrel or pin ensures that the cut out circular disk does not drop into the container. Thus, a cut is made, which is suitable for further processing by welding on connections or fitting seals and produces no chips and waste which could fall into the container.

34 Claims, 8 Drawing Figures

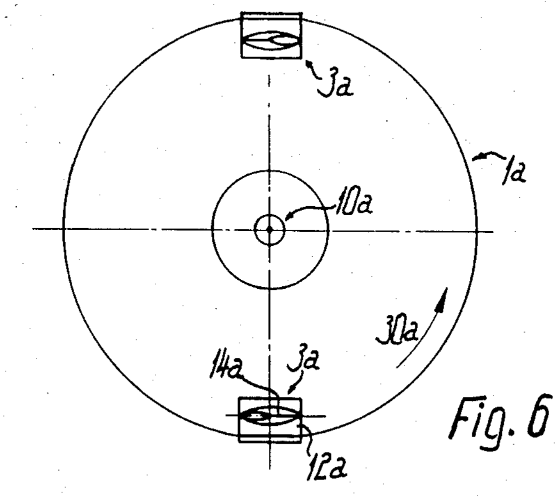
Fig. 6
Fig. 7
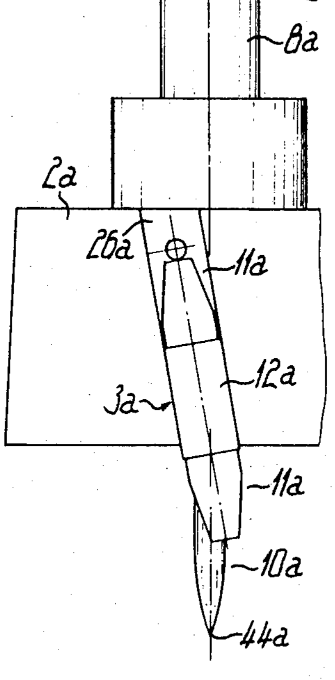
Fig. 8
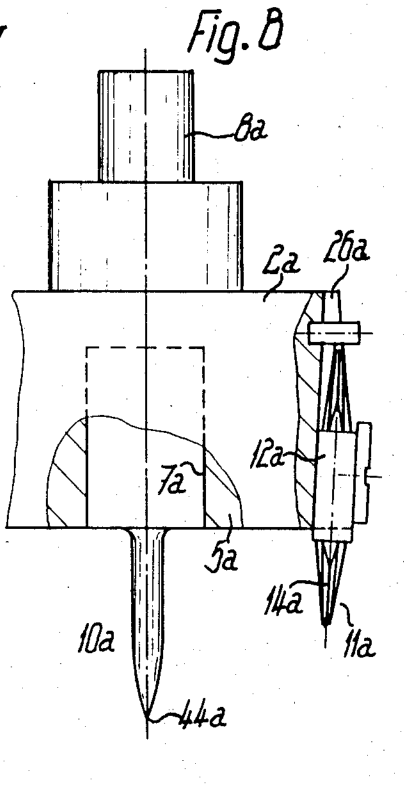

CUTTING TOOL FOR MAKING HOLES

BACKGROUND OF THE INVENTION

The present invention relates to a rotary cutting tool for making holes in walls made from thermoplastic materials or the like, particularly of containers such as car fuel tanks, with a tool body having a rotation axis as the tool axis and which for cutting out a hole disk carries a cutting member projecting freely in the direction of the tool axis with a cutting edge radially spaced from the latter.

Car petrol tanks are being increasingly produced according to the thermoplastic blowing process. After shaping by blowing air into an injection opening, further machining must take place on the tank prior to its fitting in the motor vehicle, e.g. it must be provided with a plurality of holes, which are e.g. required for the fitting of a tank pick-off, a venting nipple, etc. Smaller holes have hitherto been made as bores with a twist drill, whereas larger diameter bores are made with a cutting member constructed in the manner of a turning tool, whose cutting edge is at right angles to the tool axis or approximately parallel to the correspondingtank wall and is consequently at right angles to the rotation direction in such a way that by machining, it cuts an annular groove in the corresponding tank wall until the hole disk formed within said annular groove is completely separated from the wall and consequently a hole is formed, whose diameter corresponds to the external diameter of the turning tool. Both cutting tools suffer from the disadvantage that they can only function in a cutting manner, i.e. during the production of the hole chips and possibly cutting powder occur, whereof at least a small portion regularly passes into the tank if the holes are made overhead, because said chips and the cutting powder tend, as a result of electrostatic charging, to adhere to the tank and consequently immediately or during the further machining thereof pass through the holes and into the tank. When subsequently a vehicle engine is supplied with fuel from the tank, such chips inevitably lead to operating problems.

SUMMARY OF THE INVENTION

The problem of the invention is to provide a cutting tool making it possible to make holes in chipless manner in walls made from thermoplastic materials or materials with similar characteristics and which ensures that the resulting hole disk cannot drop in the feed direction through the wall, e.g. into the container.

According to the invention, this problem is solved in that at least one cutting member is constructed as a radially flat scoring or scratching knife and that on the tool member is provided at least one holding device for the hole disk. Thus, the cutting edge is consequently a scoring and displacement edge operating in tubeless manner and which e.g. through a very limited surface roughness on its pointed cutting edge and/or on its cutting flanks does not scrape or scratch the wall and which instead advances by a cutting displacement, without leading to the formation of any cutting particles which are detached from the wall. Following the free-cutting of the hole disk, the latter is held by the holding device opposite to the tool and is retracted again therewith, after which the hole disk is ejected by suitable means and is consequently removed from the tool.

Particularly when making small diameter holes, it can be advantageous if the cutting edge circumferentially continues at least approximately in the manner of a swivel blade edge, which can be located in a plane at right angles or slightly inclined relative to the rotation axis. According to a particularly advantageous embodiment of the invention, the cutting member has a cutting blade with a sharp cutting edge running continuously over its cutting depth and located approximately in a tangential plane of the tool, said cutting edge pointing approximately in its rotation direction and/or is located approximately parallel to the feed direction. Thus, particularly when making larger diameter holes, the cutting force exerted on the wall can be significantly reduced and consequently the cutting speed increased. However, the latter must be chosen sufficiently low that the heat resulting from the cutting operation remains below the melting point of the wall material. Cutting knives directed radially to the rotation or tool axis differ from the construction according to the invention in that said cutting knives are arranged in radially adjustable manner and not rigidly on the tool body, so that a quite different tool construction is obtained.

A particularly advantageous further development of the invention results from the fact that the tangential plane of the tool running through the cutting edge of the cutting member is inclined by a feed angle of a few angular degrees, particularly approximately 3 degrees relative to the tool axis. This makes it possible to determine on which side of the cutting gap a displacement burr will be formed by the cutting blade. If the tangential plane converges with the tool axis in the feed direction, the displacement burr occurs on the edge of the hole, whereas it occurs on the hole disk circumference if the tangential plane diverges from the tool axis in the feed direction. Due to the fact that the cutting edge is located in a single plane, uniform cutting conditions are obtained over the entire cutting depth.

According to a further development of the invention, the free end of the cutting edge is bounded by a flank. Preferably, the scoring knife as a honing knife is pulled into an inclined position with respect to the tool body and/or the cutting blade end is bounded by a flattened portion. Thus, close to the bottom of the cutting gap a relative large displacement of the material takes place accompanied by a compression displaced in the feed direction, so that the cutting blade does not have to bring about such a pronounced displacement further from the bottom of the cutting gap. The cutting burr formed on the wall surface is relatively small. According to the invention, the clearance angle is approximately 6° to 14°, preferably 10°. As a result of the flattened portion, as opposed to a cutting knife ending in arrowhead-like form, it is possible to obtain the advantage that the front knife end is much less susceptible to deformation or damage, which necessarily lead to a modified cutting behaviour with the risk of chips or cutting powder being obtained.

In order to be able to easily replace or sharpen the cutting edge with low tool costs, the scoring knife is fixed in a detachable and replaceable manner to the tool body and is preferably constructed as a reversible knife, which in particular has four reversible cutting edges on two cutting blades, so that said cutting member enables four times the number of items to be produced as compared with a single cutting edge.

It has proved advantageous for the cutting blade to have on the inside and/or outside in cross-section a convex lateral face as a flank face at least approximately passing into the cutting edge at right angles thereto. Preferably, two partially circular lateral faces pass into two cutting edges under acute tangential angles, so that a very favourable displacement behaviour of the cutting blade is obtained.

According to a further development of the invention, the cutting blade thickness decreases towards the free end under a flank angle of more than 10 angular degrees, such as approximately 20 angular degrees and/or under a many times larger flank angle than feed angle, so that even in the case of orientation in said feed angle, there is a certain displacement on either side of the cutting gap, which leads to an improved stabilization of the alignment of the cutting blade, but varies on either side of the cutting gap. At least the cutting blade and in particular the entire cutting member is constructed symmetrically to a median plane placed through its cutting edge or edges for the purpose of simple manufacture and resharpening.

In particular, when the scoring knife is constructed as a reversible knife, it is advantageous for the rear end of the cutting blade to pass into an in particular cubic fastening shank, on which preferably two oppositely projecting cutting blades are provided and/or whose outer faces, viewed in the longitudinal direction of the cutting member, on all sides project over the cutting blade, so that the sharp cutting edges are protected against damage when the cutting tool or member is stored.

According to a further development of the invention, for the necessary precisely predetermined alignment with respect to the tool axis, the cutting member is placed in an adjustment opening, particularly an adjustment slot on the tool body circumference, whose base surface fixes its feed alignment and/or whose lateral faces fix its drawing or honing angle. The cutting blade projecting counter to the feed direction is preferably completely flush in said opening and therefore protected and/or against its base surface is easily detachably secured the cutting member or fixing shank with the head of a fixing screw inserted in the tool member adjacent to the adjustment opening, without the cutting member requiring a through bore or the like for the fixing screw.

To enable the cutting member or blade to be precisely aligned in its position in the feed direction in a simple manner, a surface of the cutting member remote from the front end of the cutting blade, particularly the flank of the cutting blade projecting opposite to the feed direction engages on a supporting surface of the tool member, preferably on a cylindrical pin or the like inserted in the base surface of the adjustment slot. This leads to a linear support and engagement, which ensures a very precise alignment, there only being a very small risk of dirt or other particles getting between the associated surface of the cutting member and the supporting surface.

It is conceivable to e.g. integrate the holding device with the cutting member through it being directly formed by the scoring knife. The scoring knife or facing cutting blade can e.g. be constructed in such a way that they hold the hole disk with their radially inner flank surfaces. According to a particularly advantageous further development, the holding device projects over the scoring knife in the feed direction and is in particular a circular mandrel or the like located in the tool axis and which already engages with the hole disk before the scoring knife starts to cut. If when making the hole, working takes place in the vicinity of an already existing smaller hole, namely e.g. in the vicinity of the injection opening, then the mandrel whose diameter is adapted to this smaller hole can be truncated at its front end and can merely be provided with a short end portion, tapered in frustum-like manner for easier insertion in the hole. However, if the wall is closed in the vicinity of the hole disk being formed, then the circular mandrel is appropriately tapered at the front end to form a contact piercing point, so that it is ensured that the holding device penetrates the wall without the formation of chips or powder.

The holding device is appropriately interchangeably arranged on the tool member, particularly in a centre bore, so that for adaptation of the cutting tool to the particular requirement, it can be changed and also easily reworked. In a lightweight construction, the tool member is constructed as a cup wheel open towards the feed direction. The back of the tool member is provided with a clamping cylinder for easy fixing of the cutting tool to the main spindle of a suitable machine.

In order to obtain a uniform tool loading, according to a further feature of the invention, two or more scoring knives are provided, which are in particular uniformly distributed around the tool axis, preferably being arranged and aligned in an identical manner, so that only identical scoring knives are provided.

BRIEF DESCRIPTION OF THE DRAWINGS

The invention is described in greater detail hereinafter relative to non-limitative embodiments and the attached drawings, wherein show:

FIGS. 6 to 8 a further embodiment in representation corresponding to FIGS. 1 to 3.

DETAILED DESCRIPTION OF THE PREFERRED EMBODIMENTS

Figure 1:
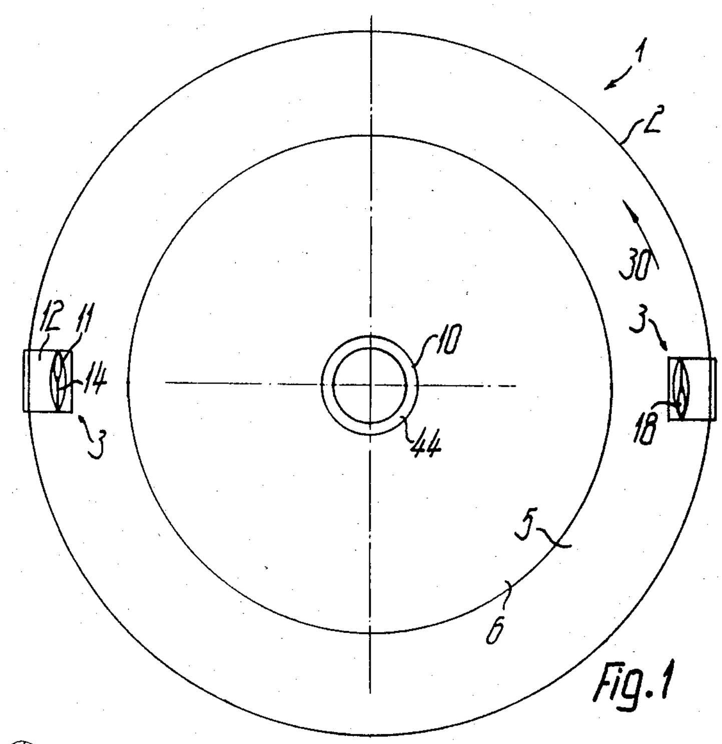
FIG. 1 an axial section on the front of a cutting tool according to the invention.

As shown in FIGS. 1 to 5, a tool 1 according to the invention has a cup wheel-like tool member 2 serving as a tool support and having two diametrically facing identical cutting members 3, which are identical and are the same with regards to their arrangement and alignment with respect to tool axis 4. Tool member 2, which is axially symmetrical and namely cylindrical with respect to tool axis 4 has a circular circumferential wall 5 which, at the rear end, passes into an approximately identically thick front plate 6, which is constructed as an annular disk through a bore 7 located in tool axis 4. A cylindrical clamping 8 shaft located in tool axis 4 is fixed by a flange 9 held by screws to the outer face of front plate 6, apart from the cutting members 3, the tool member 2 carries a holding device 10 in the form of a cylindrical mandrel, whose rear end is inserted in centered manner in bore 7 and is e.g. also secured with flange 9. The internal diameter or circumferential wall 5 is significantly larger than the external diameter of holding device 10.

Figure 4:
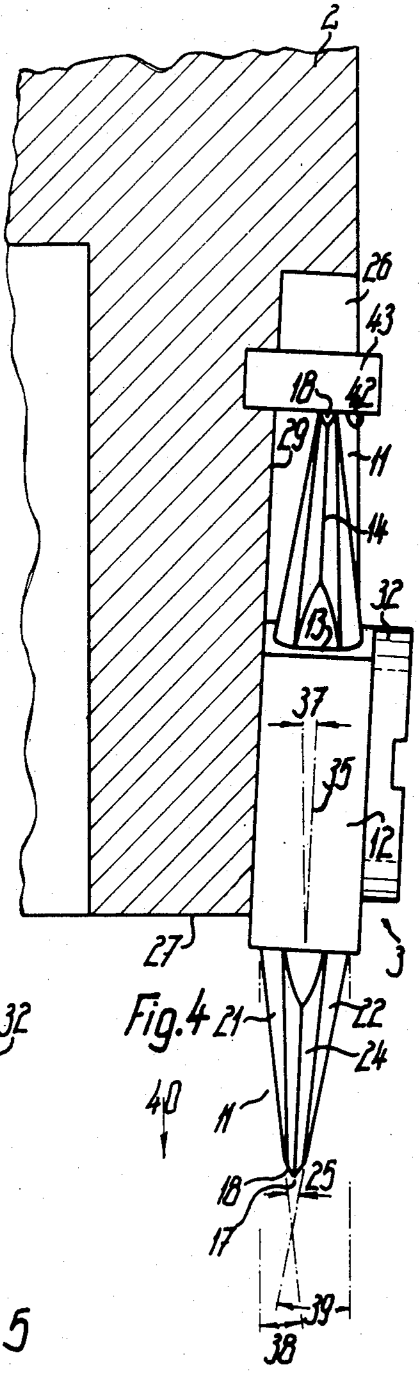
FIG. 4 a larger scale detail of FIG. 3.
Figure 5:
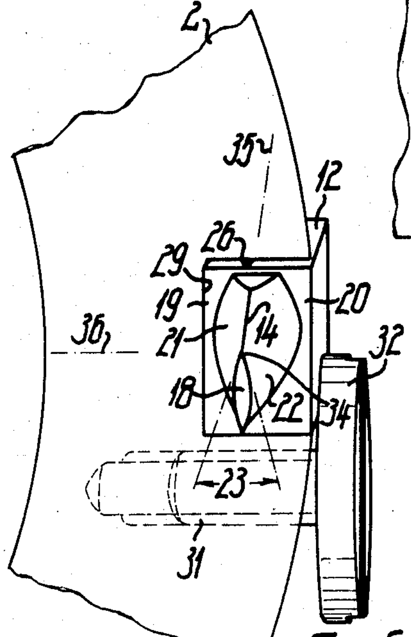
FIG. 5 the detail of FIG. 4 in an axial view corresponding to FIG. 1.

Each cutting member 3 has, as can in particular be gathered from FIGS. 4 and 5, on a fixing shank 12 constructed as an elongated rectangular block, two identical cutting blades 11 in the longitudinal direction of shank 12 and projecting therefrom. The cutting blades are in each case symmetrical to the associated end face 13 of fixing shank 12 and formed e.g. in one piece with said end face 13. The longitudinal axes of the cutting blades 11 coincide with the associated median axis of the fixing shank 12. On their remote narrow sides, each of the cutting blades 11 has a linear cutting edge 14, all the cutting edges also being identical. The two cutting edges 14 of each cuttingblade 11 are, according to FIG. 2, at an acute angle 15 of e.g. approximately 22° to one another, as well as symmetrically on either side of the associated median plane 16 of cutting member 3, which is a plane of symmetry of the cutting member. At the front or outer end 17, each cutting blade 11 is provided with a flattened portion 18 in the form of a flank, which is rectangular to the median longitudinal plane 16 and in the vicinity thereof, the cutting edges 14 led up to said flattened portion 18, have a distance from one another which is roughly half as large as their maximum spacing. In cross-section or in longitudinal view, of FIG. 5, each cutting blade 11 is approximately flat oval and namely on the inside 19 facing tool axis 4 and on the outside 20 remote from tool axis 4 is in each case bounded by a convex lateral face 21 or 22. The radius of curvature of said lateral faces 21, 22 in the particular longitudinal section of cutting blade 11 is larger than the associated spacing between the remote cutting edges 12, so that lateral faces 21, 22 pass into one another under an acute flank angle 23 of e.g. approximately 40° in the particular cutting edge 14. Instead of forming the flank faces of cutting edge 14 directly by the curved lateral faces 21, 22 according to FIG. 5, it is conceivable according to FIG. 4, to form the flank faces 24 by planar, lamellar ground surfaces of lateral faces 21, 22. The length of each cutting blade 11 is smaller than that of the fixing shank 12 and the maximum cutting depth thereof is approximately of the same order of magnitude as the greatest width measured between cutting edges 14, so that a very dimensionally stable cutting blade 11 is obtained. Towards the outer end 17, the thickness of each cutting blade 11 tapers in an acute flank angle 25 of e.g. approximately 20°, the thickness in the vicinity of the end being roughly a third of the thickness of the cutting blade 11 in the area up to which it can be used to give a maximum cutting depth. Viewed in the longitudinal direction of cutting blade 11, the fixing shaft 12 projects essentially on all sides over the cutting blades 11, in such a way that in this view it is longitudinal and rectangular and its associated larger edge dimension is in the circumferential direction of tool 1. As a result of the described construction of the particular cutting member, the advantages essential to the invention are obtained, namely in particular a very good cutting behaviour, a high cutting speed and long edge life periods, whilst avoiding vibrations of the cutting member and cutting blades 11.

As is further shown by FIGS. 1 to 5, for receiving the particular cutting member 3, the tool member 2 has on the outer periphery of circumferential wall 5 an adjustment slot 26, which extends longitudinally from the front end face 27 of tool member 2 approximately up to the level of the inner face of front plate 6. The width and depth of adjustment slot 26 are adapted to the fixing shank 12 in such a way that the latter fits with a slight slide or push fit, i.e. substantially in clearance-free manner, between the lateral faces 28 of the adjustment slot 26 and on engaging on its base surface 29 is arranged substantially flush in slot 26, at least in the vicinity of end face 27. Relative to the working - rotation direction arrow 30, adjacent to the trailing lateral face 28 of adjustment slot 26 and outside the same, a fixing screw 31 is inserted in a taphole on the outer circumference of tool member 2 and its relatively large diameter head 32 engages over the fixing shank 12 on the side remote from the base face 29 with an almost semicircular segment portion and with the latter presses the entire surface of the shank 12 in clamping manner against base face 29. The diameter of head 32 roughly corresponds to the length of fixing shank 12. Head 32 engages over roughly half the width of fixing shank 12 and stands back with respect to the end face 27 of tool member 2.

Figure 2:
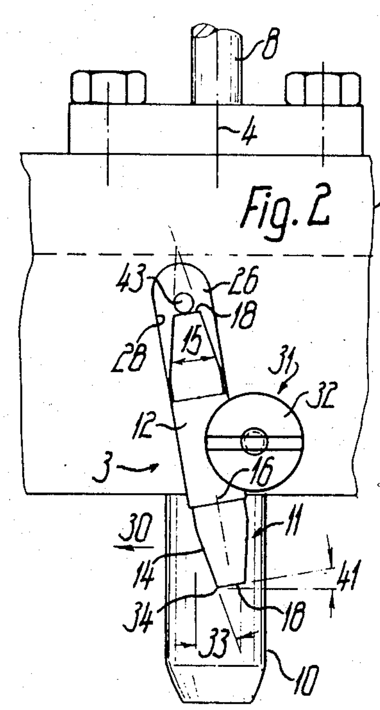
FIG. 2 is a detailed side view of FIG. 1.

As can in particular be gathered from FIG. 2, the median longitudinal plane of the adjustment slot 26 coinciding with the median longitudinal plane 16 of the cutting member 3 is inclined with respect to tool axis 4 by an acute angle of approximately 10° in radial view of cutting member 3, so that the end of adjustment slot 26 located in end face 27 trails with respect to its other closed end, with respect to the rotation direction arrow 30. Thus, in conjunction with the half of the angle 15, by which the particular cutting edge 14 is inclined with respect to the median longitudinal plane 16 of cutting member 3, a honing or drawing off angle 33 of approximately 20° is obtained, under which the cutting edge 14 intended for cutting use is pulled in inclined manner with respect to the tool body, so that each cutting blade 11 in cutting use acts as a honing knife. The cutting edge 14 on the same cutting blade 11, but which is not in use, in the radial view of FIG. 2 is approximately parallel to tool axis 4.

The particular cutting edge 14 intended for cutting use is oriented in such a way that only the cutting tip 34 formed by its outermost end and adjacent to the flattened portion 18, in the rectangular view of the median plane of said cutting edge 14 according to FIG. 2, is located in the axial plane of tool axis 4 at right angles to said median plane, whereas the following portions of cutting edge 14 are outside (in front of) said axial plane, in the rotation direction indicated by arrow 30. The indicated median plane of cutting edge 14 is roughly a tangential plane 35 of tool 1, which therefore intersects the axial plane 36 of tool axis 4 which is at right angles thereto in a line in which the cutting tip 34 is approximately located.

As is further shown by FIG. 4, the bottom surface 29 of adjustment slot 26 is inclined by a few degrees, e.g. approximately 3° relative to the tool axis in such a way that the median plane of the cutting blade 11 intended for cutting use and coinciding with the tangential plane 35 is inclined by a corresponding feed angle 37 with respect to the tool axis 4. Thus, in conjunction with the flank angle 25 for the lateral faces 21, 22 of the cutting blade 11, different setting angles 38, 39 opening in the feed direction of arrow 40 are obtained. In the represented embodiment, the setting angle 38 of the inner lateral face 21 is smaller than the setting angle 39 of the outer lateral face 22 and is namely selected in such a way that a cutting burr formed on cutting appears in the working area of the outer lateral face 22, i.e. on the edge of the hole to be made. As a result of a corresponding oppositely directed inclining, in which setting angle 39 is smaller than setting angle 38, the cutting burr is formed on the hole disk. The smaller setting angle 38 can approach 0° and in the represented embodiment is 4°, whereas the larger setting angle 39 is approximately 14°. As a result of the described arrangement and alignment of the cutting edges 14 for cutting use, advantages which are essential to the invention are obtained, namely a stabilization of the cutting blades during cutting and a reduction of the cutting forces acting on the cutting edges. This is particularly the case if the clearance angle 41 of the flattened portion, flank 18 is approximately 10°.

A stop or support surface 42 is provided on the tool member 2 for the longitudinal alignment of the particular cutting member 3 with respect to tool member 2. On said support surface 42 engages the particular cutting member 3 with the flank or flattened portion 18 of that cutting blade 11, which is not intended for cutting use and is instead positioned flush in adjustment slot 26. Supporting surface 42 is formed by the circumferential surface of a cylindrical pin 43, which is e.g. inserted by pressing into the base surface 29 of adjustment slot 26, in the vicinity of its closed or rear end. Supporting surface 42 is arranged in such a way that the fixing shank 12 projects slightly above the front end face 27 of tool member 2.

Figure 3:
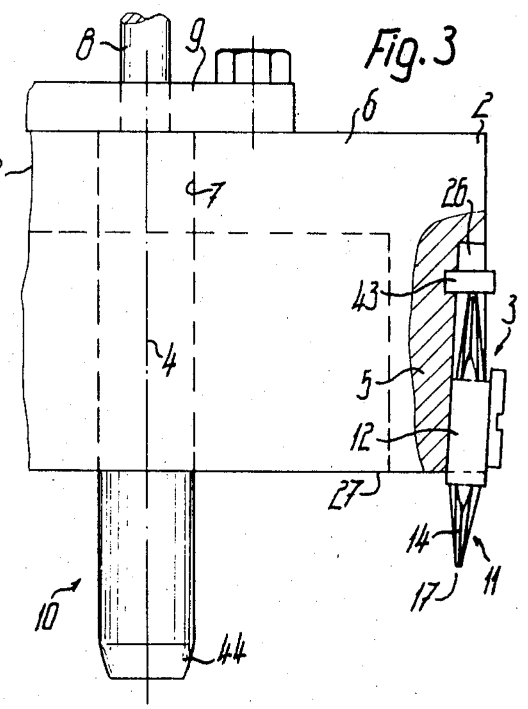
FIG. 3 a part sectional view of the arrangement according to FIG. 2 in a position rotated by 90° around the tool axis.

As is further shown by FIGS. 1 to 3, holding device 10 projects over the front end 17 of cutting edge 14 by a multiple of the cutting depth thereof. At its front end, holding device 10 is provided with an end portion 44, which tapers in frustum-like manner and whose rear end is spaced upstream of the front end of cutting edge 14 and which in the view according to FIGS. 2 and 3, passes in slightly rounded manner into the cylindrical outer periphery of holding device 10. The latter is intended for those cases in which the hole to be made is to be produced in the vicinity of an already existing smaller diameter hole. The external diameter of the holding device 10 is adapted to the internal diameter of the smaller hole in such a way that it engages therein with predetermined friction.

In FIGS. 6 to 8, the same parts are given the same reference numerals as in FIGS. 1 to 5, but in each case index "a" is added.

Tool 1*a* according to FIGS. 6 to 8 differs from that of FIGS. 1 to 5 essentially in that the front end of the holding device 10*a* is tapered to form a sharp contact piercing point 44*a*. Thus, prior to the start of cutting by cutting edges 14*a*, the holding device 10*a* can penetrate the area of the wall to be worked, which will subsequently be cut from said wall as the hole disk. Holding device 10*a* is inserted with its wider diameter shank in replaceable manner in bore 7*a* of tool member 2*a* constructed in the form of a blind bore and which is formed by the inner circumference of circumferential wall 5*a*. On the rear end face, tool member 2*a* has a stepped clamping cylinder 8*a*. The adjustment slots 26*a* pass to the rear end face of the tool member 2*a*.

What is claimed is:

1. A rotary cutting tool for cutting holes in walls of thermoplastic material or the like, including containers, fuel tanks and the like, said cutting tool comprising:

a tool body having a tool axis, said tool axis being a rotation axis, at least one cutting member comprising a scoring knife having a flattened shape in a direction radially to said rotation axis mounted on said tool body, said cutting member having a free end projecting in a direction substantially parallel to said rotation axis, a cutting edge at said free end positioned at a distance from the rotation axis for cutting a hole opening wall disk out of a wall by rotating and moving in a feed movement of a feed direction substantially parallel to the rotation axis as the cutting depth of a ring slot around the rotation axis in the wall progresses during rotation, a holding device for the cut wall disk mounted on said tool body, said holding device having a shaft for penetrating said wall disk without cutting off any cutting particles and engaging said wall disk with a predetermined friction for holding the wall disk to said tool, whereby said cutting edge cuts the ring slot without cutting off any cutting particles from the wall and the wall disk merely by dispossessing the material of the wall.

2. A cutting tool according to claim 1, wherein said scoring knife has a radially inner and a radially outer side with respect to the rotation axis, said radially inner side being adapted for holding the wall disk to said tool.

3. A cutting tool according to claim 1, wherein said cutting member at its free end has at least one cutting blade with at least one cutting edge located approximately in a tangential plane of the tool and which passes continuously over its cutting depth, said cutting edge pointing in the rotation direction and being substantially parallel to the feed direction.

4. A cutting tool according to claim 3, wherein said free end of the cutting blade is bounded by an end face positioned at a free angle with respect to the rotation direction.

5. A cutting tool according to claim 3, wherein said cutting blade is cross-section at right angles through the cutting edge has on the radially inner side a convex lateral face passing substantially into the cutting edge so as to form an inner side face of the cutting edge.

6. A cutting tool according to claim 3, wherein the cutting blade in cross-section at right angles through the cutting edge has on the radially outer side a convex lateral face passing substantially into the cutting edge thereby forming an outer side face of the cutting edge.

7. A cutting tool according to claim 3, wherein in cross-section through the cutting blade, two graduated circular lateral faces pass into one another at acute angles thereby forming two cutting edges.

8. A cutting tool according to claim 3, wherein the thickness of the cutting blade decreases towards the free end of the cutting member at an angle of more than 10 degrees.

9. A cutting tool according to claim 3, wherein the cutting blade is inclined under a feed angle with respect to the feed direction for positioning in a feed alignment, the thickness of the cutting blade decreasing towards the free end of the cutting member at an angle several times larger than the feed angle.

10. A cutting tool according to claim 3, wherein said cutting blade and said cutting member are symmetrical to a median plane passing through its cutting edge.

11. A cutting tool according to claim 3, wherein a rear end of the cutting blade passes into a cubic fixing shank having circumferential outer faces projecting on all sides over the cutting blade when viewed in the longitudinal direction of the cutting member.

12. A cutting tool according to claim 11, wherein two oppositely projecting cutting blades are provided on the fixing shank.

13. A cutting tool according to claim 12, wherein the tool body has an outer periphery, the adjustment opening being formed by an adjustment slot on the outer periphery of the tool body, the base surface fixing the feed alignment and the lateral faces fixing the trailing angle of the cutting member.

14. A cutting tool according to claim 3, wherein a surface of the cutting member remote from the free end of the cutting blade engages on a supporting surface of the tool body.

15. A cutting tool according to claim 14, wherein the end face of the cutting blade projecting counter to the feed direction engages on the supporting surface of the tool body.

16. A cutting tool according to claim 14, wherein the support surface is formed by a cylindrical pin or the like inserted in the base surface of the adjustment opening.

17. A cutting tool according to claim 1, wherein the tangential plane of the tool passing through the cutting edge of the cutting member is inclined by a feed angle with respect to the tool axis.

18. A cutting tool according to claim 17, wherein the tangential plane of the tool passing through the cutting edge of the tool member is inclined by a feed angle of about 3° to the tool axis.

19. A cutting tool according to claim 1, wherein the scoring knife is positioned as a trailing knife and is inclined by a trailing angle whereby the cutting edge is positioned to trail behind with respect to the tool body.

20. A cutting tool according to claim 1, wherein the free end of the cutting blade is bounded by a flattened portion.

21. A cutting tool according to claim 1, wherein the scoring knife is detachably and interchangeably fixed to the tool body.

22. A cutting tool according to claim 1, wherein the scoring knife is a reversible knife having at least two cutting edges for alternately positioning one of said cutting edges in an operating position by reversing said scoring knife with respect to said tool body.

23. A cutting tool according to claim 22, wherein said reversible knife has two cutting blades with four cutting edges, an operating cutting blade projecting substantially inward and a non-operating cutting blade projecting substantially counter to the feed direction.

24. A cutting tool according to claim 22, wherein said cutting member is placed in an adjustment opening of the tool body, said opening having a base surface and lateral surfaces and receiving the cutting blade projecting counter to the feed direction in a completely flush manner.

25. A cutting tool according to claim 24, wherein the cutting member is fixed against the base surface of the adjustment opening by means of the head of a fixing screw inserted in the tool body adjacent to said opening.

26. A cutting tool according to claim 1, wherein the holding device for the wall disk projects past the scoring knife in the feed direction.

27. A cutting tool according to claim 1, wherein the punch for penetrating the wall disk is circular and located in the rotation axis.

28. A cutting tool according to claim 1, wherein the end of the holding device for the wall disk is tapered to form a contact piercing point.

29. A cutting tool according to claim 1, wherein the holding device is interchangeably arranged on the tool body.

30. A cutting tool according to claim 1, wherein the holding device is arranged in a center bore of the tool body.

31. A cutting tool according to claim 1, wherein the tool body is constructed as a cup wheel open in the feed direction.

32. A cutting tool according to claim 1, including a clamping cylinder on the back of the tool body.

33. A cutting tool according to claim 1, wherein two or more scoring knives are uniformly distributed around the rotation axis.

34. A cutting tool according to claim 33, wherein the scoring knives are substantially similar and are identically arranged on the tool body.

* * * * *